(12) United States Patent
Drobnik

(10) Patent No.: US 7,157,887 B2
(45) Date of Patent: Jan. 2, 2007

(54) DIRECT AMPLITUDE MODULATION FOR SWITCH MODE POWER SUPPLIES

(75) Inventor: Josef C. Drobnik, Perris, CA (US)

(73) Assignee: Power Paragon, Inc., Anaheim, CA (US)

( * ) Notice: Subject to any disclaimer, the term of this patent is extended or adjusted under 35 U.S.C. 154(b) by 134 days.

(21) Appl. No.: 11/034,011

(22) Filed: Jan. 11, 2005

(65) Prior Publication Data

US 2006/0049814 A1  Mar. 9, 2006

Related U.S. Application Data

(60) Provisional application No. 60/607,962, filed on Sep. 8, 2004.

(51) Int. Cl.
*G05F 1/10* (2006.01)
(52) U.S. Cl. ..................................... 323/222
(58) Field of Classification Search ............... 323/220, 323/222, 223, 225, 271, 282; 363/17, 132
See application file for complete search history.

(56) References Cited

U.S. PATENT DOCUMENTS

| | | | |
|---|---|---|---|
| 5,847,548 A * | 12/1998 | He et al. ................. | 323/222 |
| 6,084,790 A * | 7/2000 | Wong ...................... | 363/71 |
| 6,541,944 B1 * | 4/2003 | Hwang .................... | 323/225 |
| 6,606,260 B1 * | 8/2003 | Ahlstrom ................. | 363/125 |
| 6,617,757 B1 * | 9/2003 | Vazquez Carazo et al. . | 310/317 |
| 6,628,275 B1 * | 9/2003 | Vossen et al. ............ | 345/211 |
| 7,009,852 B1 * | 3/2006 | Ying et al. ............... | 363/17 |

* cited by examiner

*Primary Examiner*—Adolf Berhane
(74) *Attorney, Agent, or Firm*—Farjami & Farjami LLP

(57) ABSTRACT

In one aspect, a switch mode power supply comprises a first inductive element; a first switching element, wherein a first end of the first switching element is connected to a second end of the first inductive element; a second inductive element; a second switching element, wherein a first end of the second switching element is connected to a second end of the second inductive element; and wherein a first power source terminal is connected to a first end of the first inductive element and a first end of the second inductive element, and a second power source terminal is connected to a second end of the first switching element and a second end of the second switching element, and wherein a load is connected to the first end of the first switching element and the first end of the second switching element.

22 Claims, 9 Drawing Sheets

DIRECT AMPLITUDE MODULATION FOR SWITCH MODE POWER SUPPLIES

RELATED APPLICATIONS

The present application is based on and claims priority from U.S. Provisional Application Ser. No. 60/607,962, filed Sep. 8, 2004, which is hereby incorporated fully by reference.

BACKGROUND OF THE INVENTION

1. Field of the Invention

The present invention is generally in the field of electrical power systems. More specifically, the present invention is in the field of switch mode power supplies.

2. Background Art

Today, power supplies are critical components of many industrial and household electronics. A power supply is sometimes called a power converter and the process is called power conversion. The Power Sources Manufacturers Association's (PSMA) Handbook of Standardized Terminology for the Power Sources Industry defines a power supply as "a device for the conversion of available power of one set of characteristics to another set of characteristics to meet specified requirements." Power supplies may change the characteristics of the power source voltage and/or current, and include AC to AC, AC to DC, DC to AC and DC to DC power supplies.

For example, from personal computers to hairdryers and cell phone chargers, many electronic items need to convert the 120 Volts, 60 Hz, AC power found in a home in the United States or 220 Volts, 50 Hz, AC power found in other countries to adapt to appropriate characteristics required by the electronic equipment. As an example, personal computers typically require a 5 Volts DC power to operate their internal electronic components, which is provided by a power supply within personal computer that receives and converts the 120 Volts, AC power to 5 Volts DC power.

A switch mode power supply (SMPS) is a power supply that utilizes switches or transistors in conjunction with low loss components such as capacitors, inductors, and transformers. SMPS is known for its low power dissipation, which equates to high efficiency. SMPS has been used for many years in industrial and aerospace applications. Today, SMPS is used extensively in AC powered electronic devices, such as computers, monitors, television receivers, VCRs, etc.

A variety of converter topologies are used in SMPS to regulate power. Today, there are a variety of basic topologies in use, including flyback converters, boost converters, single transistor forward converters, half bridge forward converters, full bridge ZVT converters, etc. As an example, FIG. 1 illustrates conventional half bridge converter 100 along with example related waveforms 130. As shown, half bridge converter 100 includes switching transistor Q1 102, switching transistor Q2 104, capacitor C1 In 106, capacitor C2 In 108, flux balance capacitor 110, half bridge transformer 112, diode CR1 114, diode CR2 116, recirculating diode 118, capacitor C Out 120, and output filter inductor 122. Voltage signals +VIn 124, −VIn 126, +VOut 128, and −VOut 130 are also indicated. In a first stage, when switching transistor Q1 102 turns on, the voltage is reflected across the output windings, and rectified by diode CR1 114, charging output filter inductor 122. When transistor Q1 102 turns off, the voltage drive across half bridge transformer 112 primary drops to zero, and energy stored in the leakage and magnetizing inductances causes a turn-off overshoot, which is clamped by the body diode of transistor Q2 104. In a second stage, switching transistor Q2 104 turns on, and half bridge transformer 112 is driven in the opposite direction, resetting the flux balance in the half bridge transformer 112 core. The output of half bridge transformer 112 is connected to a half wave rectifier, so the alternating polarity pulse train is rectified into a unidirectional pulse train of twice the frequency. Output capacitor C Out 120 and output filter inductor 122 store energy and integrate the duty cycle so that the output voltage is proportional to the product of the rectified output voltage and duty cycle.

Furthermore, SMPS may use pulse width modulation (PWM) or pulse rate modulation (PRM) to regulate the power. For example, television receivers and computer monitors may use either PWM or PRM, while VCRs typically use PRM supplies. PWM SMPS performs its function by varying the "on" or conduction time of the switches or transistors, such that the frequency of the input signal remains constant while the duty cycle varies. As the width of the pulse is increased, the switching transistor stays on longer, and more energy is applied to the switching transformer, which increases the output voltage. Likewise, as the pulse width is made narrower, the transistor is on for a shorter amount of time, and less energy is applied to the transformer. On the other hand, PRM SMPS varies the rate or frequency at which the switching transistor is turned off and on. As the pulse rate increases, the "on" time of the switch decreases. When the switching transistor is turned on and off at a faster rate, less energy is applied to the transformer.

In view of the present state of the art, there remains a strong need for an SMPS topology that can offer a unique control strategy to enable multi-function switches, provide a direct pulse-by-pulse conversion of pulse-width into amplitude, eliminate the dead time between the PWM pulses, eliminate the need for overly complex circuitry, generate less high frequency ripple at the outputs, and improve power density and efficiency.

SUMMARY OF THE INVENTION

The present invention is directed to direct amplitude modulation for switch mode power supplies ("SMPS"). The invention overcomes the need in the art for an SMPS topology that can offer a unique control strategy to enable multi-function switches, provide a direct pulse-by-pulse conversion of pulse-width into amplitude, eliminate the dead time between the PWM pulses, eliminate the need for overly complex circuitry, generate less high frequency ripple at the outputs, as well as input, improve power density and efficiency, and other advantages.

In one aspect of the present invention, a switch mode power supply comprises a first inductive element having a first end and a second end; a first switching element having a first end and a second end, wherein the first end of the first switching element is connected to the second end of the first inductive element; a second switching element having a first end and a second end, wherein the first end of the second switching element is connected to the second end of the first switching element; a second inductive element having a first end and a second end; a third switching element having a first end and a second end; and a fourth switching element having a first end and a second end, wherein the first end of the fourth switching element is connected to the second end of the second inductive element, and wherein the second end of the fourth switching element is connected to the first end of the third switching element; wherein a first power source terminal is connected to the first end of the first inductive element and the first end of the second inductive element, and a second power source terminal is connected to the second end of the second switching element and the second end of the third switching element, and wherein a load is connected to the second end of the first switching element and the second end of the fourth switching element.

In an additional aspect, the switch mode power supply further comprises a controller circuit, wherein the control circuit provides a switching signal to each of the first switching element, the second switching element, the third switching element and the fourth switching element.

In another aspect, the switch mode power supply operates in four consecutive time periods, including a first time period, a second time period, a third time period and a fourth time period. During the first time period the first switching element is open, the second switching element is closed, the third switching element is open and the fourth switching element is closed. During the second time period the first switching element is closed, the second switching element is closed, the third switching element is open and the fourth switching element is closed. During the third time period the first switching element is closed, the second switching element is open, the third switching element is closed and the fourth switching element is open. During the fourth time period the first switching element is closed, the second switching element is open, the third switching element is closed and the fourth switching element is closed.

In another aspect, the switch mode power supply includes additional circuitry for transferring an excess energy in each of the first inductive element and the second inductive element to the load. In yet a different aspect, the switch mode power supply includes additional circuitry for transferring an excess energy in each of the first inductive element and the second inductive element to the power source.

In a separate aspect of the present invention, a method of supplying power is provided, which uses a power supply, a first inductive element, a second inductive element, a load, a first switching element, a second switching element, a third switching element and a fourth switching element. The method comprises opening the first switching element, closing the second switching element, opening the third switching element and closing the fourth switching element during a first time period to create a first circuit including the second switching element connected to the load connected to the fourth switching element connected to the power supply connected to the second switching element; closing the first switching element, closing the second switching element, opening the third switching element and closing the fourth switching element during a second time period to create the first circuit, and a second circuit including the second switching element connected to the first switching element connected to the power supply connected to the second switching element; closing the first switching element, opening the second switching element, closing the third switching element and opening the fourth switching element during a third time period to create a third circuit including the third switching element connected to the load connected to the first switching element connected to the power supply connected to the third switching element; and closing the first switching element, opening the second switching element, closing the third switching element and closing the fourth switching element during a fourth time period to create the third circuit, and a fourth circuit including the third switching element connected to the fourth switching element connected to the power supply connected to the third switching element.

In another aspect, the method further comprises storing energy in the first inductive element during the second time period; and transferring the energy in the first inductive element to the load during the third time period. Yet, in a different aspect, the method further comprises storing, energy in the second inductive element during the fourth time period; and transferring the energy in the second inductive element to the load during the first time period.

In other aspects, the method further comprises transferring an excess energy in each of the first inductive element and the second inductive element to the power source, or transferring an excess energy in each of the first inductive element and the second inductive element to the load.

In another separate aspect, a switch mode power supply comprises a first inductive element having a first end and a second end; a first switching element having a first end and a second end, wherein the first end of the first switching element is connected to the second end of the first inductive element; a second inductive element having a first end and a second end; a second switching element having a first end and a second end, wherein the first end of the second switching element is connected to the second end of the second inductive element; and wherein a first power source terminal is connected to the first end of the first inductive element and the first end of the second inductive element, and a second power source terminal is connected to the second end of the first switching element and the second end of the second switching element, and wherein a load is connected to the first end of the first switching element and the first end of the second switching element.

Other features and advantages of the present invention will become more readily apparent to those of ordinary skill in the art after reviewing the following detailed description and accompanying drawings.

DETAILED DESCRIPTION OF THE INVENTION

Figure 1:
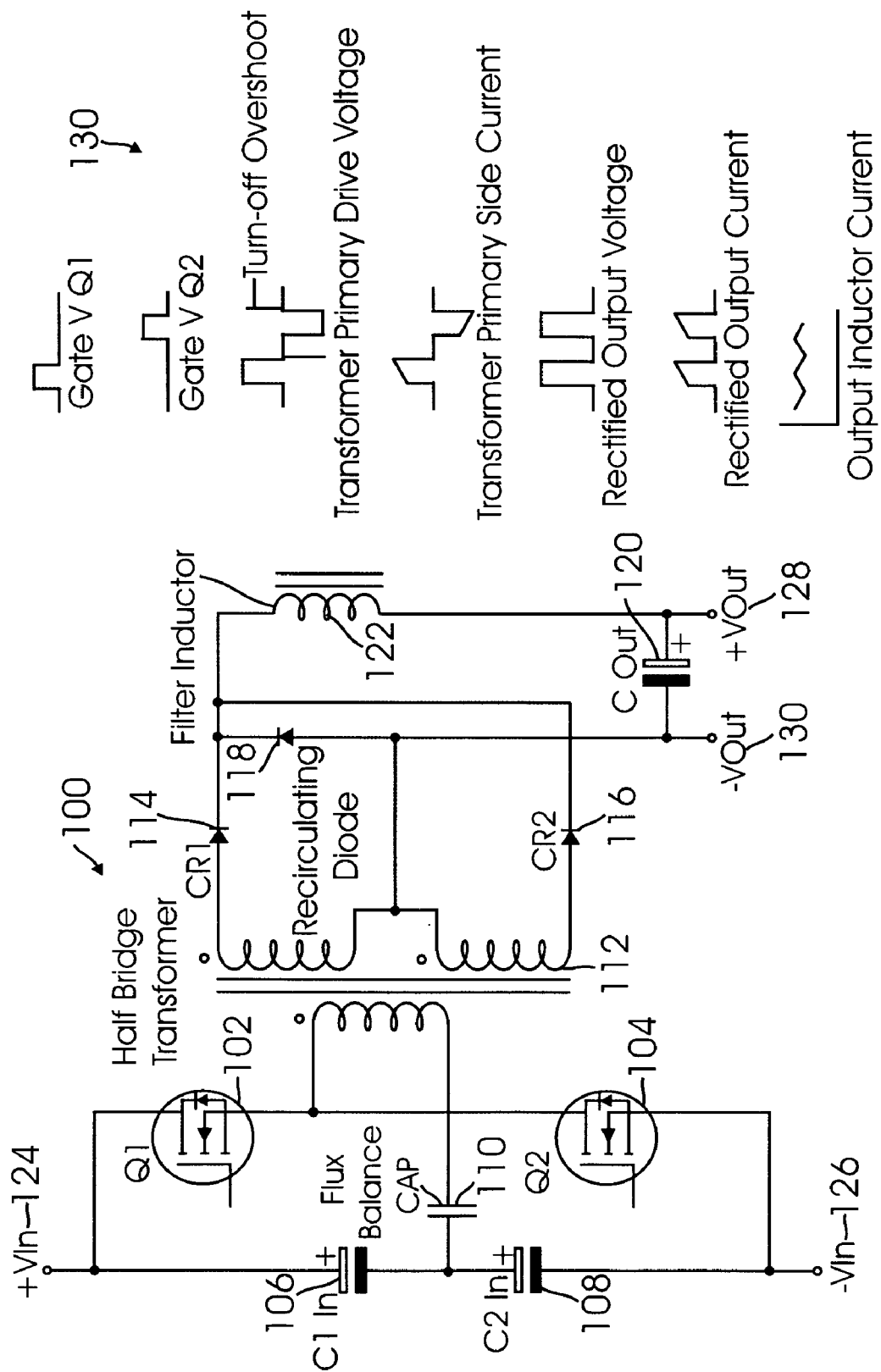
FIG. 1 illustrates a conventional half bridge converter topology for an SMPS.

Although the invention is described with respect to specific embodiments, the principles of the invention can obviously be applied beyond the specifically described embodiments of the invention described herein. Moreover, in the description of the present invention, certain details have been left out to not obscure the inventive aspects of the invention. The details left out are within the knowledge of a person of ordinary skill in the art. The drawings in the present application and their accompanying detailed description are directed to merely example embodiments of the invention. Like or corresponding reference numerals may indicate like or corresponding elements among the figures. To maintain brevity, other embodiments of the invention which use the principles of the present invention are not specifically described in the present application and are not specifically illustrated by the present drawings.

Embodiments according to the present invention relate to direct conversion of duty cycle into amplitude in a switch mode power supply or SMPS. As shown herein, an H-bridge converter along with a unique control strategy enables multi-function of the individual switches within the H-bridge converter and direct pulse-by-pulse conversion of pulse-width into amplitude.

Figure 2:
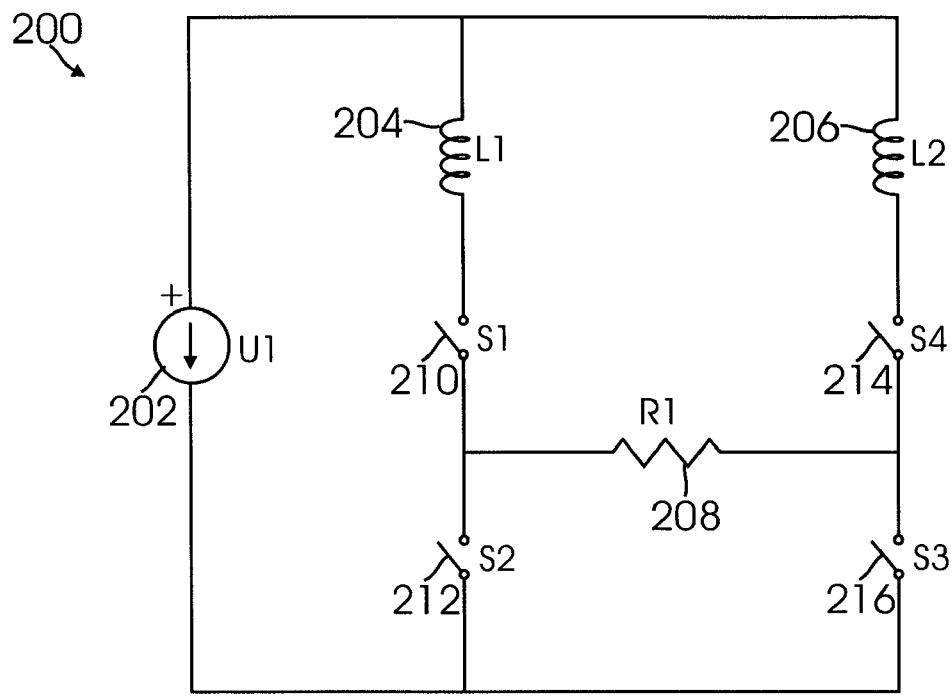
FIG. 2 illustrates a converter topology for an SMPS, according to one embodiment of the present invention.

FIG. 2 illustrates an example converter topology for an SMPS, according to one embodiment of the present invention. H-bridge converter 200 can be used to convert a voltage of a signal, such as a direct current ("DC") signal, from a first voltage to a second voltage. For example, H-bridge converter 200 can be used to convert a 120V signal to a 240V (step-up) signal in one illustrative embodiment. In another illustrative embodiment, H-bridge converter 200 can be used to convert a 120V signal to a 5V signal (step-down).

H-bridge converter 200 comprises source U1 202, inductive elements, such as inductor L1 204, inductor L2 206, load R1 208, and switching elements, such as switch S1 210, switch S2 212, switch S3 216, and switch S4 214. Control and driver circuitry (not shown) can be coupled to switches S1 210, S2 212, S3 216 and S4 214 to control "on" time and "off" time of the switches. Switches S1 210, S2 212, S3 216 and S4 214 are responsive to switching signals generated by the control circuitry. In one embodiment, switches S1 210, S2 212, S3 216 and S4 214 can be any other suitable transistor, switching devices, IGBT, GTO, MOSFET or any other semiconductor or not-semiconductor based switch. Source 202 is a power source, such as a DC current source (or DC voltage source), in one embodiment. As shown, H-bridge converter 200 comprises two vertical branches, with inductor L1 204 in one vertical branch and inductor L2 206 in the other vertical branch.

Conventional H-bridge converter allow only two switches, one in each vertical branch to be ON (closed or conducting) at a time, and in order to provide an energy transfer, the two switches are diagonal to each other. In contrast, various embodiments of the present invention do not have such limitations and can allow three and even all four of switches S1 210, S2 212, S3 216 and S4 214 to be ON at a time. For example, as shown below, turning ON three of switches S1 210, S2 212, S3 216 and S4 214 at a time creates two independent electrical circuits, enabling performance of two conversion cycles simultaneously.

Figure 3:
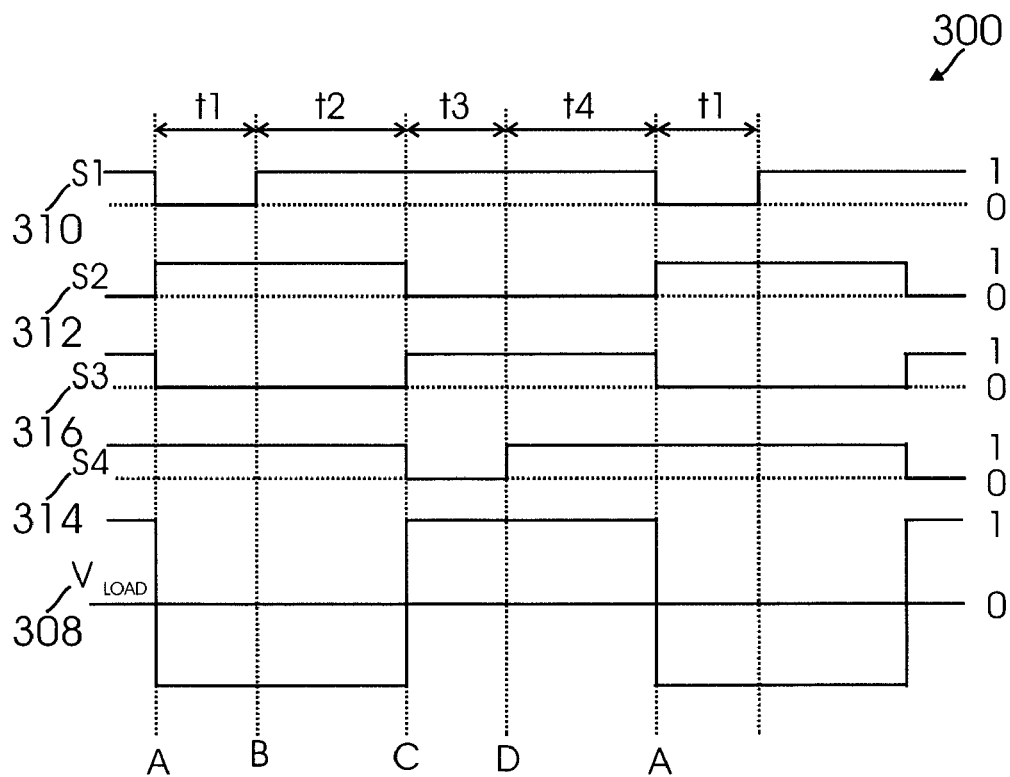
FIG. 3 illustrates an example timing diagram for the converter of FIG. 2.

FIG. 3 depicts example timing diagram 300 for controlling switches S1 210, S2 212, S3 216 and S4 214 by the control circuitry, where the value "1" represents a particular switch being ON (or closed) and the value "0" represents a particular switch being OFF (or open). Accordingly, S1 timing 310, S2 timing 312, S3 timing 316 and S4 timing 314 indicate the ON and OFF states of switches S1 210, S2 212, S3 216, and S4 214, respectively. $V_{LOAD}$ timing 308 corresponds to the voltage across the load, namely the voltage across load R1 208. In this illustrative example, an effective duty-cycle ("D") is chosen to be 80 percent. In other words, the control circuitry controls the switches such that switch S1 210 is ON 80 percent of the time. The timing diagram of FIG. 3 shows one cycle of operation divided into four time periods t1, t2, t3, and t4. A new cycle begins at the second t1 time period.

Figure 4:
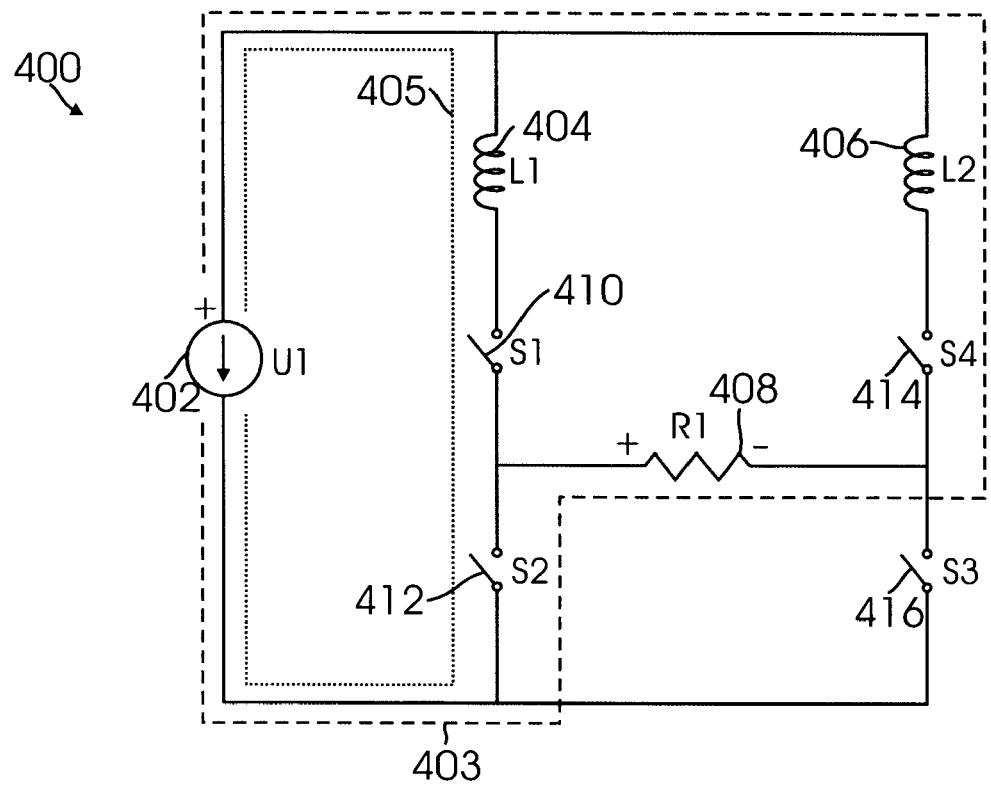
FIG. 4 illustrates two circuits formed in the converter of FIG. 2 during t1 and t2 of FIG. 3.

As shown in FIG. 3, when time period "t1" begins and during this period, switches S2 212 and S4 214 are ON, and switches S1 210 and S3 216 are OFF. Accordingly, referring to FIG. 4, outside dashed line 403 in H-bridge converter 400 defines the current path for time period "t1". Consequently, energy is transferred from source U1 402 through inductor L2 406 (using energy previously stored in inductor L2 406) and switch S4 414 to load R1 408 in the negative direction with respect to load R1 408, and the circuit is closed through switch S2 412.

Next, when time period "t2" begins, and during this period, switches S2 412 and S4 414 remain ON and, additionally, switch S1 410 is turned ON, and switch S3 416 remains OFF. Thus, an additional circuit is created, which is shown by inside dotted line 405 in FIG. 4, where this additional circuit enables inductor L1 404 to store energy for the next half cycle.

Figure 5:
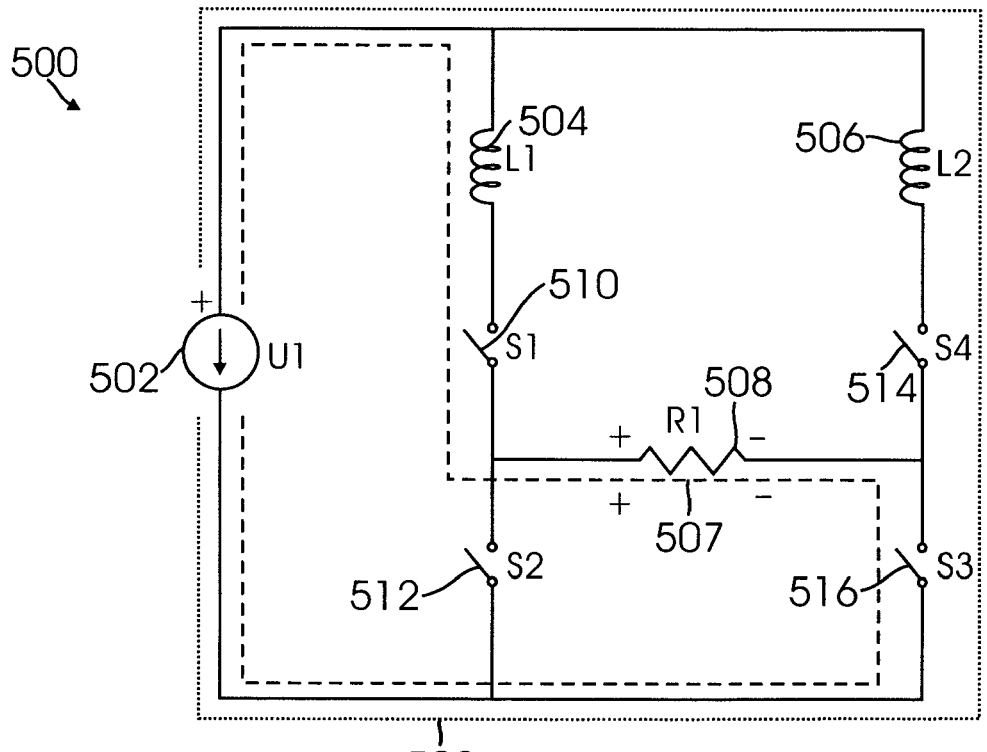
FIG. 5 illustrates two circuits formed in the converter of FIG. 2 during t3 and t4 of FIG. 3.

Now referring to FIGs. 3 and 5, when time period "t3" begins and during this period, switch S1 510 remains ON, switches S2 512 and 54 514 are turned OFF, and switch S3 516 is turned ON. As a consequence, the circuit indicated by inside dashed line 507 is created and the energy is transferred from source U1 502. Additionally, the energy that was previously stored in inductor L1 404 (now, 504) during time period "t2" is added and applied in the positive direction to load R1 508.

When time period "t4" begins and during this period, switch S1 510 remains ON, switch S2 512 remains OFF, switch S3 516 remains ON, and switch S4 514 is turned ON. While the energy transfer continues for the circuit indicated by inside dashed line 507, a new circuit indicated by outside dotted line 509 is formed. As a result, in preparation for the next quarter-cycle, i.e. next "t1", inductor L2 506 stores energy during time period "t4". At the end of time period "t4," the cycle is complete and time period "t1" begins once again. As shown in FIG. 3, $V_{LOAD}$ 308 is negative for time periods "t1" and "t2", and positive for time periods "t3" and "t4". It should be noted that $V_{LOAD}$ 308 could also be rectified if desired, or further stepped up or down by transformer.

Table 1 below illustrates various states of H-bridge converter 200 along with a basic set of related equations.

TABLE 1

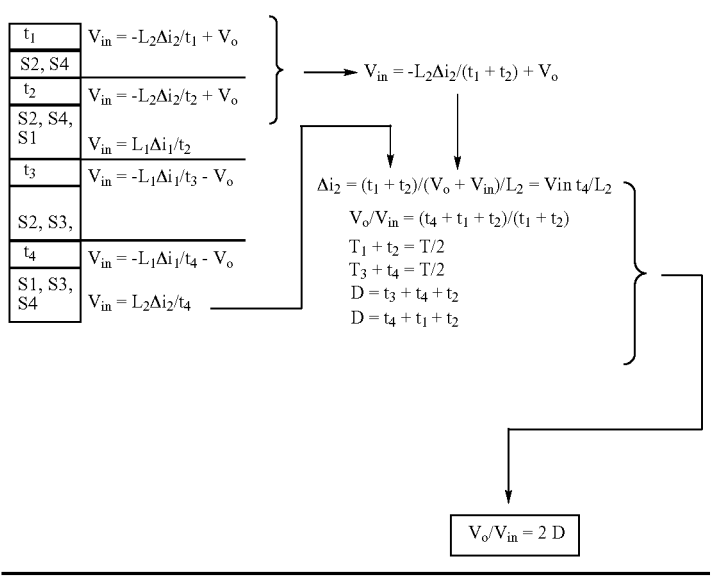

One of ordinary skill in the art can derive from the above equations that, according to one embodiment of the present invention, the output voltage Vo across R1 408 (or $V_{LOAD}$) divided by the input voltage Vin across source U1 402 is twice the duty cycle or 2D.

Figure 6:
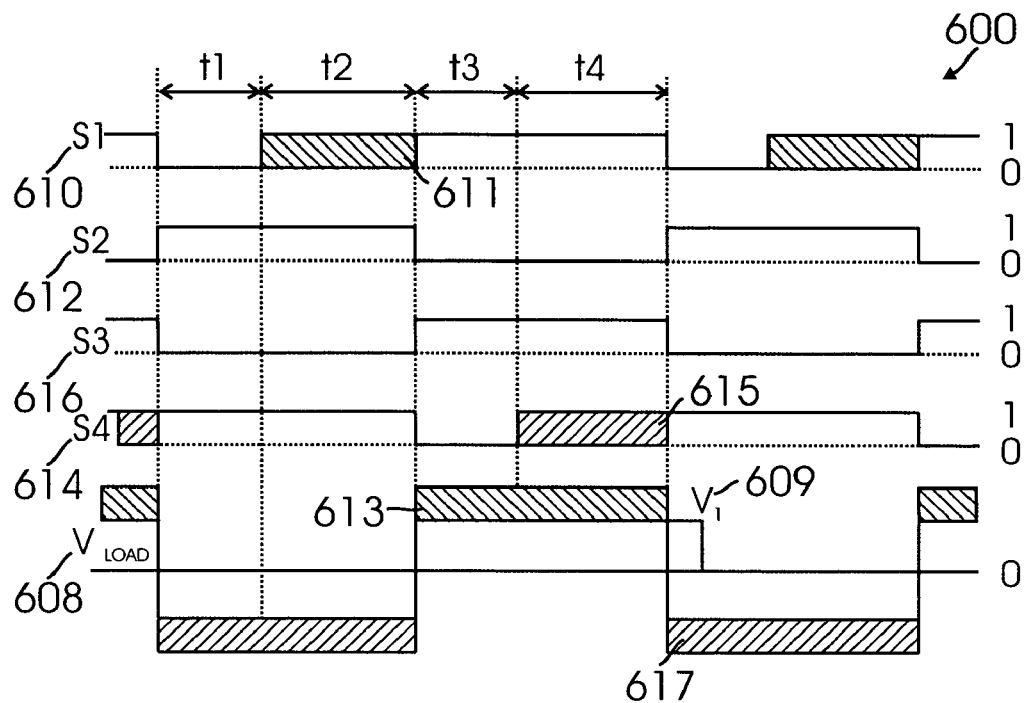
FIG. 6 illustrates time-to-amplitude conversion for the converter of FIG. 2 based on the timing diagram of FIG. 3.

Advantageously, as described herein, during time period "t2" L1 404 stores energy that is used during time period "t3 and t4" to boost the output, and during time period "t4" L2 506 stores energy that is used during next time period "t1 and t2" to boost the output. Further, with reference to FIG. 6, each of time periods "t2" and "t4" respectively translates directly, pulse-by-pulse, into a voltage in addition to Vin within the next half-cycle. S1 timing 610, S2 timing 612, S3 timing 616, S4 timing 614 and $V_{LOAD}$ 608 correspond to S1 timing 310, S2 timing 312, S3 timing 316, S4 timing 314 and $V_{LOAD}$ 308, respectively. As shown in FIG. 6, the duration of HIGH pulse 611 (time period "t2") determines the magnitude of positive half-period 613. Similarly, the duration of HIGH pulse 615 (time period "t4") determines the magnitude of negative half-period 617. In addition, in embodiments according to the present invention, there is no dead time between the PWM pulses of $V_{LOAD}$ 608, as shown in FIG. 6.

Although $V_{LOAD}$ 608 is symmetrical AC, which could be applied to a transformer if desired, in other embodiments, $V_{LOAD}$ could be made asymmetrical, which can be utilized in special applications, such as a ringing generator with a DC offset. Furthermore, $V_{LOAD}$ can be rectified and filtered, using various techniques known in the art.

In one embodiment of the present invention, the control circuitry operates H-bridge converter 200 in a discontinuous mode. In the discontinuous mode of operation, the energy from each inductor is fully exhausted before switch S1 210 or switch S2 212 is turned OFF, respectively. It should be noted that the discontinuous operation of inductors L1 204 and L2 206 does not necessarily mean that a discontinuous current is generated at the output of H-bridge converter 200. This is due to the fact that the load current comprises of interleaved current from both vertical branches.

Figure 7:
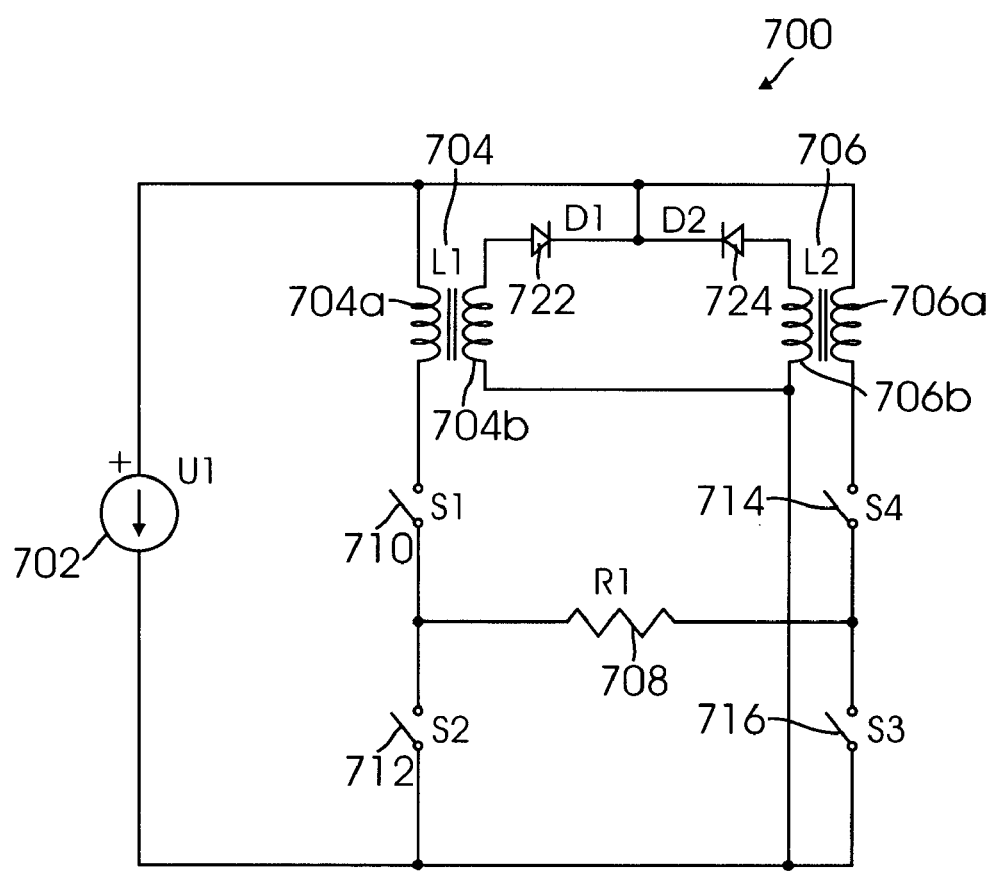
FIG. 7 illustrates a converter for transfer of unused inductive energy to the source, according to one embodiment of present invention.

Turning to FIG. 7, it illustrates H-bridge converter 700 capable of transferring unused inductive energy to source 702, according to one embodiment of present invention. The embodiment of FIG. 7 allows for operation of H-bridge converter 700 in a continuous mode. More specifically, as a result of changes to H-bridge converter 200 of FIG. 2 to arrive at H-bridge converter 700 of FIG. 7, the excess energy stored in air gap of the transformer-inductor L1 704 and L2 706 is return to source 702 through the secondary winding of each inductor L1 704b and L2 706b and respective diodes D1 722 and D2 724. It should also be noted that a transformer configuration could also be implemented between the output of the bridge and diodes D1 722 and D2 724 that can serve as a rectifier.

As shown in FIG. 7, H-bridge converter 700 comprises source 702, transformer-inductor L1 primary winding 704a and secondary winding 704b, transformer-inductor L2 primary winding 706a and secondary winding 706b, load R1 708, switch S1 710, switch S2 712, switch S3 716, switch S4 714, diode D1 722, and diode D2 724. The timings for switches S1 710, S2 712, S3 716 and S4 714 are similar to the timings for switches S1 210, S2 212, S3 216 and S4 214, such that H-bridge converter 700 operates similar to H-bridge converter 200. However, transformer-inductor L1 secondary winding 704b and diode D1 722 are provided to return previously stored and unused energy in L1 to source U1 702. Similarly, transformer-inductor L2 secondary winding 706b and diode D2 724 are provided to return unused previously stored energy in L2 to source U1 702. As understood by one of ordinary skill in the art, diodes D1 722 and D2 724 cause the current to pass in a single direction from anode of each diode to its cathode, i.e. the direction of source U1 702, which facilitates the transfer of excess energy from the inductors to source U1 702.

Figure 8:
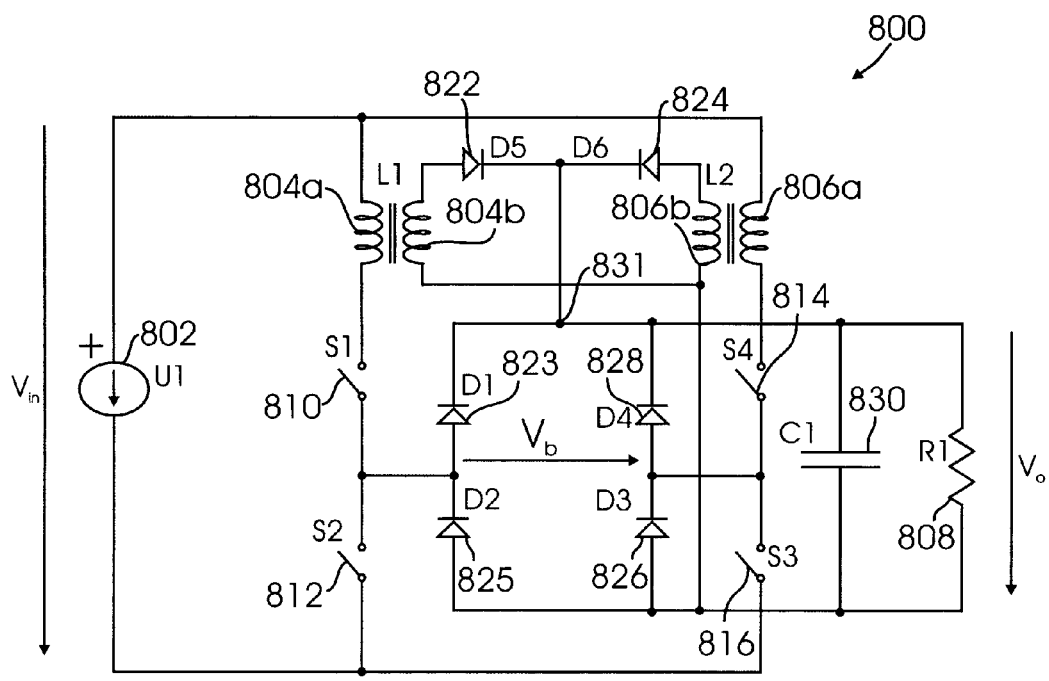
FIG. 8 illustrates a converter for transfer of unused inductive energy to the load, according to one embodiment of present invention.

Referring now to FIG. 8, it illustrates modification to H-bridge converter 200, such that excess energy in L1 804 and L2 806 can be transferred to the load R1 808, rather than being transferred to source U1 702 as shown in FIG. 7. FIG. 8 illustrates H-bridge converter 800 for transfer of unused or excess energy in transformer-inductor L1 primary winding 804a and transformer-inductor L2 primary winding 806a to source U1 802, according to one embodiment of present invention. As shown, H-bridge converter 800 comprises source U1 802, transformer-inductor L1 primary winding 804a and secondary winding 804b, transformer-inductor L2 primary winding 806a and secondary winding 806b, load R1 808, switch S1 810, switch S2 812, switch S3 816, switch S4 814, diode D1 823, diode D2 825, diode D3 826, diode D4 828, diode D5 822, diode D6 824, and capacitor C1 830. It is noted that load R1 808 and capacitor C1 830 are coupled in parallel. Capacitor C1 serves the purpose of an output filter for load R1.

The operation of H-bridge converter 800 is somewhat analogous to the operation of H-bridge converter 700. However, the excess energy in transformer-inductor L1 primary winding 804a and transformer-inductor L2 primary winding 806a is transferred to the load in H-bridge converter 800, as opposed to the source in H-bridge converter 700. Current or energy can pass through transformer-inductor L1 secondary winding 804b through diode D5 822 to node 831. Current can also pass through transformer-inductor L2 secondary winding 806b through diode D6 824 to node 831. Current can further pass through diodes D1 823 through D4 828 to node 831. From node 831, energy or current can pass to load R1 808, or also through switches S4 814 and S3 816. As understood by one of ordinary skill in the art, diodes in FIG. 8 cause the current to pass in a single direction, i.e. the direction of load R1 808, which facilitates the transfer of excess energy in the inductors to the load.

The specification and components details of an experimental H-bridge converter 800 are shown below in Table 2.

TABLE 2

EXPERIMENTAL CONVERTER SPECIFICATION

| FSW | [kHz] | 100 |
| Vin | [V] | 48 |
| Vo | [V] | 48 |
| PoMAX | [W] | 750 |
| ΔVoMAX | [V] | 0.5 |
| ΔIin MAX | [A] | 5 |
| EFF | [%] | 92 |

COMPONENTS

| S1 through S4 | IRF3710ZS |
| L1, L2 | 20 uH/18 A |
| D1 through D4 | 100BGQ100J |
| C1 | 200 uF/100 V |
| U1, U2 (drivers) | IR2085S |
| Arbitrary generator | AWG400 |

Figure 9:
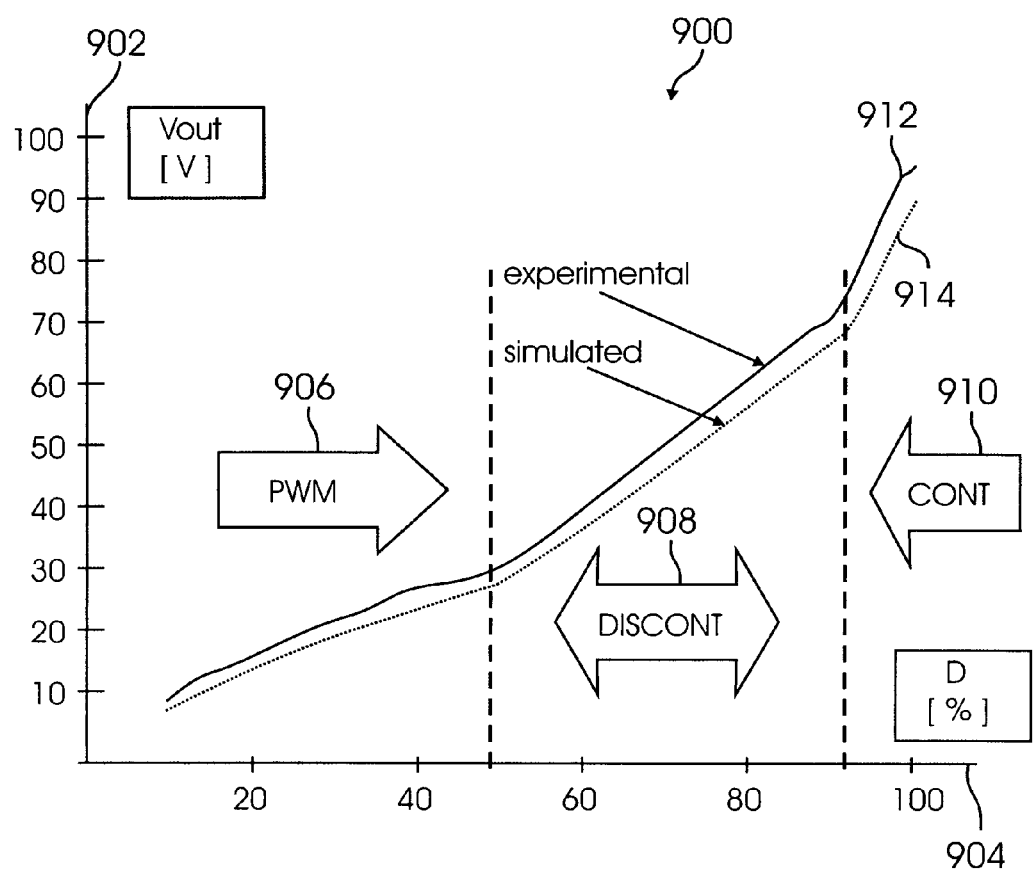
FIG. 9 illustrates an output voltage dependency on the duty cycle for the converter of FIG. 8, including three modes of operation PWM, discontinuous and continuous.

Referring to FIG. 9, graph 900 illustrates an output voltage dependency on the duty cycle for the converter of FIG. 8, including three modes of operation PWM, discontinuous and continuous. Vertical axis 902 represents output voltage (Vo) in Volts and horizontal axis 904 represents the effective duty cycle (D) in percentage. Three different modes of operation are shown in FIG. 9 to be PWM mode 906, discontinuous mode 908, and continuous mode 910. Experimental output voltage dependency indicator 912 and simulated output voltage dependency indicator 914 are shown, spanning the three modes of operation. As shown, below a duty cycle of approximately fifty percent (50%), H-bridge converter 800 is operated in PWM mode 906 and basically functions as a regular bridge. The amplitude of the PWM pulses does not change with the pulse width (i.e. with the duty cycle). For a duty cycle ranging from approximately fifty percent (50%) to approximately ninety percent (90%), H-bridge converter 800 operates in an enhanced mode in discontinuous mode 908. For a duty cycle greater than approximately ninety percent (90%), H-bridge converter 800 operates in continuous mode 910.

Figure 10:
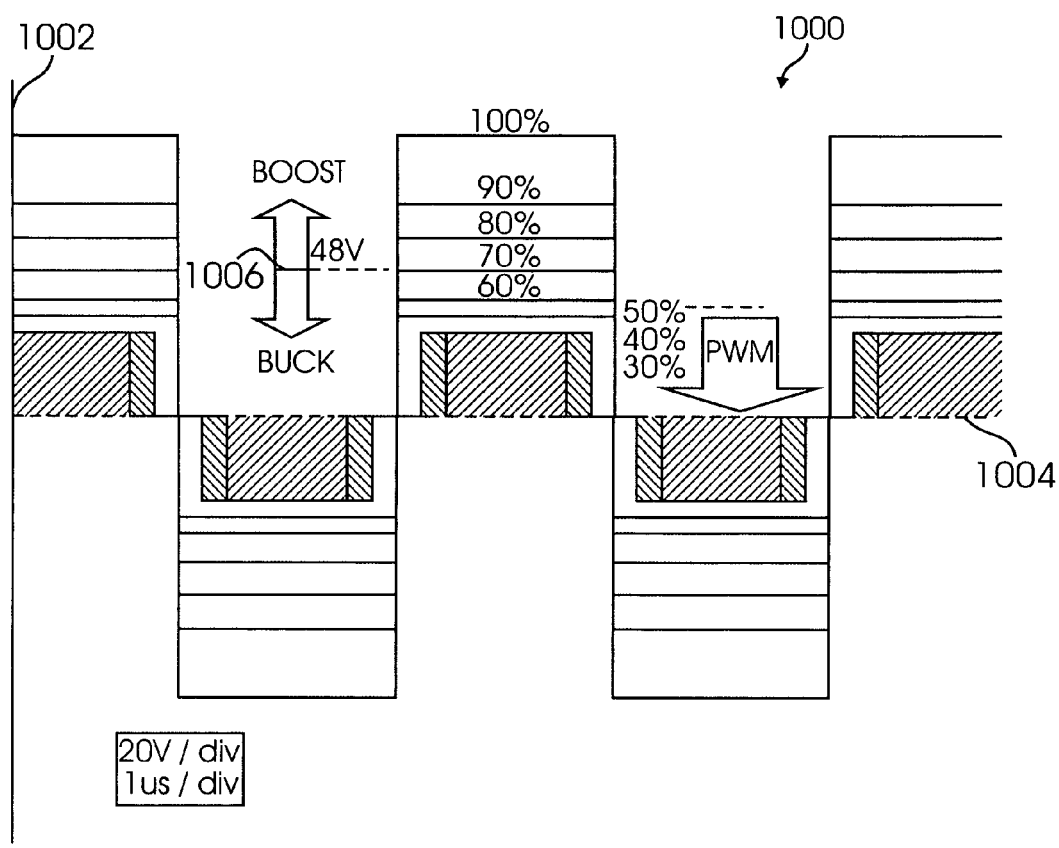
FIG. 10 illustrates an output waveform at various duty cycles for the converter of FIG. 8.

Referring to FIG. 10, graph 1000 illustrates an output waveform at various duty cycles for the converter of FIG. 8. Specifically, Vb in is plotted in Volts on vertical axis 1002. Each division in the vertical direction is equal to 20 volts. Horizontal axis 1004 represents time. As indicated, buck-boost boundary 1006 lies at a duty cycle of approximately seventy percent (70%); in this particular example, a voltage of approximately 48 volts. For a duty cycle above approximately fifty percent (50%), the dead time is not present and the amplitude of the PWM pulses is changing with the effective duty cycle. After passing a duty cycle of about ninety percent (90%), the inductors run in continuous mode. It is important to note that while the current within individual inductors may be discontinuous, the output current may still—due to the fact that both vertical branches are interleaved—be continuous.

Figure 11:
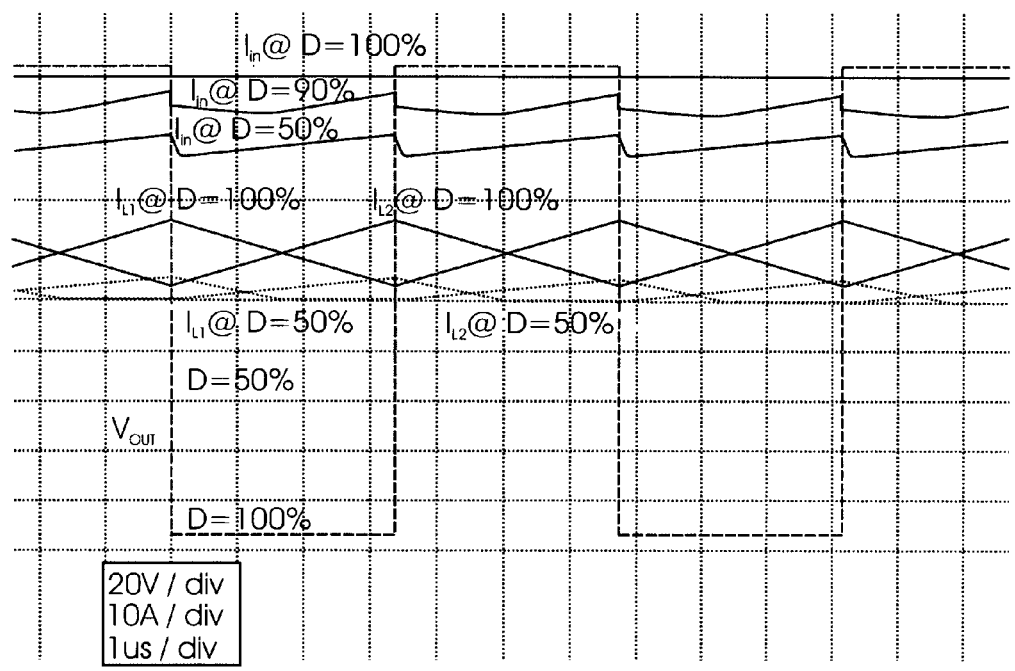
FIG. 11 illustrates input current and inductor currents for the converter of FIG. 8.

FIG. 11 illustrates graph 1100 depicting input current and inductor currents for H-bridge converter 800 of FIG. 8. For example, corresponding inductors and input current waveforms for a duty cycle of fifty percent (50%) (discontinuous mode) and a duty cycle of one-hundred percent (100%) (continuous mode) are presented. When the duty cycle is one-hundred percent (100%), switches S1 810 and S4 814 are permanently ON and essentially eliminated. Consequently, input ripple is substantially eliminated, because the summation of the inductor currents is constant at any point of time. This configuration will also eliminate the ability to control the output voltage. The waveform may be shifted up and down using asymmetrical control.

Figure 12:
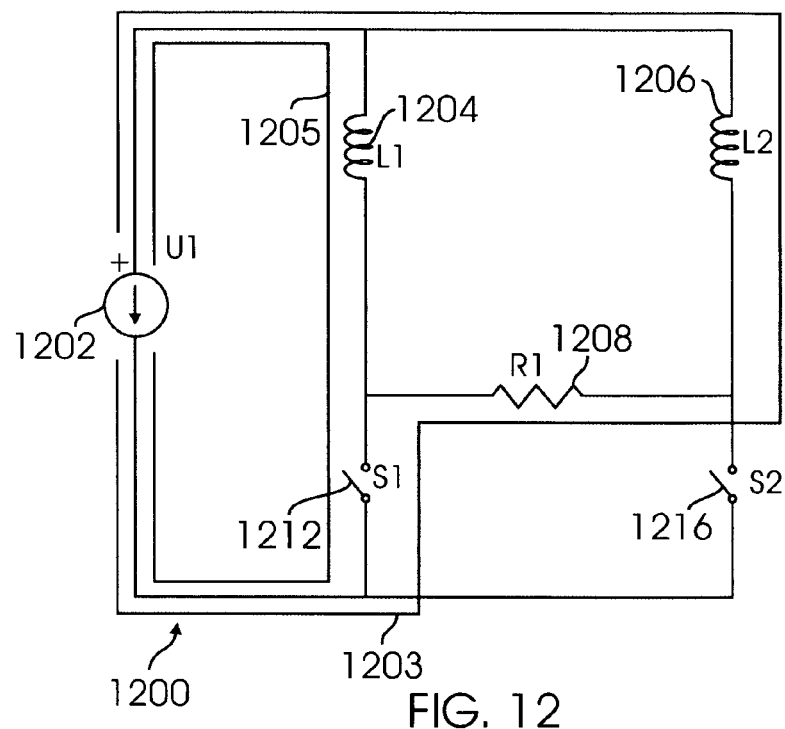
FIG. 12 illustrates a converter topology for an SMPS, according to one embodiment of the present invention, depicting two circuits formed in the converter during a first time period.

A duty cycle of one-hundred percent (100%) means that both S1 210 and S4 214 switches within the H-bridge converter 200 of FIG. 2 remain ON at all time, while the other two switches, i.e. S2 212 and S3 216, are switched alternately ON and OFF. This embodiment is depicted in FIG. 12, as another embodiment of the present invention. FIG. 12 illustrates two-switch H-bridge converter 1200, with switch S1 1212 ON and switch S2 1216 OFF, according to one embodiment of the present invention. H-bridge converter 1200 comprises source 1202, inductor L1 1204, inductor L2 1206, load R1 1208, switch S1 1212, and switch S2 1216.

With reference to FIG. 12, in order to achieve symmetrical waveforms, the duty cycle of each switch should be fifty percent (50%), with 180 degrees of offset between the switches. Special applications, for example ringing generators, may require asymmetrical waveforms. This symmetry can be achieved by varying the duty-cycle further. The functionality of H-bridge 1200 depicted in FIG. 12 is described as follows. When switch S1 1212 is ON, two circuits are conducting current independently. First circuit 1205 comprises source U1 1202, inductor L1 1204, and switch S1 1212. During this half cycle, energy is stored in inductor L1 1204. Simultaneously, second circuit 1203 is created, which provides a current path including source U1 1202, inductor L2 1206, load R1 1208, and switch S1 1212. In second circuit 1203, the energy from source U1 1202 plus the energy stored in inductor L2 1206 during the previous half cycle are delivered to load R1 1208.

Figure 13:
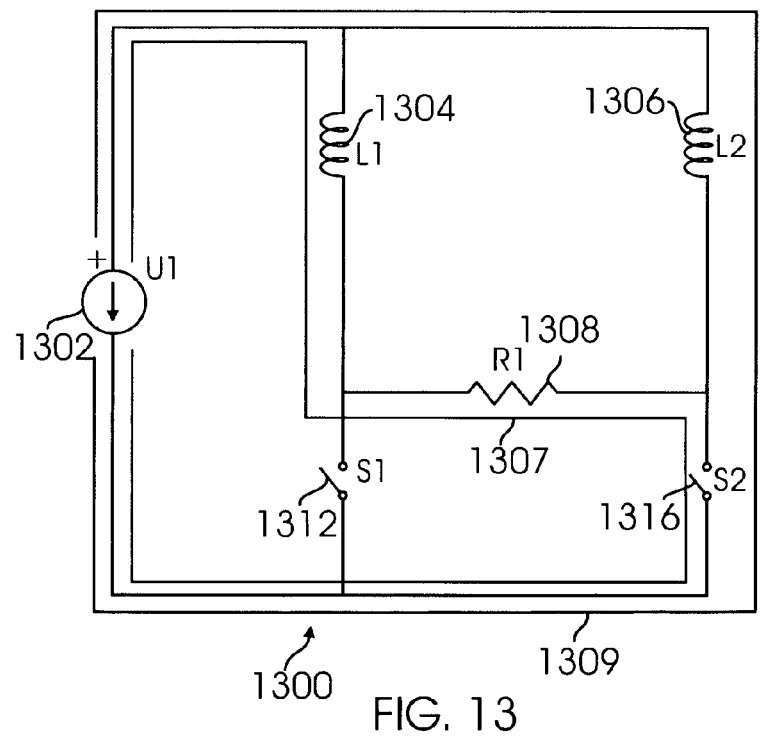
FIG. 13 illustrates the converter topology of FIG. 12 depicting two circuits formed in the converter during a second time period.

Referring to FIG. 13, H-bridge converter 1300 comprises source 1302, transformer L1 1304, transformer L2 1306, load R1 1308, switch S1 1312, and switch S2 1316. When switch S1 1312 is OFF and switch S2 1316 is ON, first circuit 1307 and second circuit 1309 are created. Inductor L2 1306 will be storing energy, while source U1 1302 and inductor L1 1304, using the energy stored during the previous half cycle, supply current to load R1 1308. The polarity across load R1 1308 will be opposite during this half period, as shown in FIGS. 13 and 14. The cycles described in FIGS. 13 and 14 will continue repeating.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A switch mode power supply comprising:
   a first inductive element having a first end and a second end;
   a first switching element having a first end and a second end, wherein said first end of said first switching element is connected to said second end of said first inductive element;
   a second switching element having a first end and a second end, wherein said first end of said second switching element is connected to said second end of said first switching element;
   a second inductive element having a first end and a second end;
   a third switching element having a first end and a second end; and
   a fourth switching element having a first end and a second end, wherein said first end of said fourth switching element is connected to said second end of said second inductive element, and wherein said second end of said fourth switching element is connected to said first end of said third switching element;
   wherein a first power source terminal is connected to said first end of said first inductive element and said first end of said second inductive element, and a second power source terminal is connected to said second end of said second switching element and said second end of said third switching element, and wherein a load is connected to said second end of said first switching element and said second end of said fourth switching element;
   wherein said switch mode power supply operates in a plurality of consecutive time periods, and wherein during at least one of said plurality of consecutive time periods more than two of said switching elements are closed.

2. The switch mode power supply of claim 1 further comprising a controller circuit, wherein said control circuit provides a switching signal to each of said first switching element, said second switching element, said third switching element and said fourth switching element.

3. The switch mode power supply of claim 1, wherein said switch mode power supply operates in four consecutive time periods, including a first time period, a second time period, a third time period and a fourth time period.

4. The switch mode power supply of claim 3, wherein during said first time period said first switching element is open, said second switching element is closed, said third switching element is open and said fourth switching element is closed.

5. The switch mode power supply of claim 3, wherein during said second time period said first switching element is closed, said second switching element is closed, said third switching element is open and said fourth switching element is closed.

6. The switch mode power supply of claim 3, wherein during said third time period said first switching element is closed, said second switching element is open, said third switching element is closed and said fourth switching element is open.

7. The switch mode power supply of claim 3, wherein during said fourth time period said first switching element is closed, said second switching element is open, said third switching element is closed and said fourth switching element is closed.

8. The switch mode power supply of claim 1 further comprising:
   a third inductive element forming a first transformer-inductor with said first inductive element, said third inductive element having a first end and a second end, wherein said second end of said third inductive element is connected to said second power source terminal;
   a fourth inductive element forming a second transformer-inductor with said second inductive element, said fourth inductive element having a first end and a second end, wherein said second end of said fourth inductive element is connected to said second power source terminal;
   a first diode having a cathode and an anode, wherein said anode of said first diode is connected to said first end of said third inductive element, and wherein said cathode of said first diode is connected to said first end of said first inductive element; and
   a second diode having a cathode and an anode, wherein said anode of said second diode is connected to said first end of said fourth inductive element, and wherein said cathode of said second diode is connected to said first end of said second inductive element.

9. The switch mode power supply of claim 8, wherein said switch mode power supply transfers an excess energy in each of said first inductive element and said second inductive element to said power source.

10. The switch mode power supply of claim 1 comprising a circuit for transferring an excess energy in each of said first inductive element and said second inductive element to said load.

11. The switch mode power supply of claim 1 comprising a circuit for transferring an excess energy in each of said first inductive element and said second inductive element to said power source.

12. The switch mode power supply of claim 1, wherein each of said first switching element, said second switching element, said third switching element and said fourth switching element includes a transistor.

13. A method of supplying power using a power supply, a first inductive element, a second inductive element, a load, a first switching element, a second switching element, a third switching element and a fourth switching element, said method comprising:
   opening said first switching element, closing said second switching element, opening said third switching element and closing said fourth switching element during a first time period to create a first circuit including said second switching element connected to said load connected to said fourth switching element connected to said power supply connected to said second switching element;

closing said first switching element, closing said second switching element, opening said third switching element and closing said fourth switching element during a second time period to create said first circuit, and a second circuit including said second switching element connected to said first switching element connected to said power supply connected to said second switching element;

closing said first switching element, opening said second switching element, closing said third switching element and opening said fourth switching element during a third time period to create a third circuit including said third switching element connected to said load connected to said first switching element connected to said power supply connected to said third switching element; and closing said first switching element, opening said second switching element, closing said third switching element and closing said fourth switching element during a fourth time period to create said third circuit, and a fourth circuit including said third switching element connected to said fourth switching element connected to said power supply connected to said third switching element.

14. The method of claim 13 further comprising:
storing energy in said first inductive element during said second time period; and
transferring said energy from said first inductive element to said load during said third time period.

15. The method of claim 13 further comprising:
storing energy in said second inductive element during said fourth time period; and
transferring said energy in said second inductive element to said load during said first time period.

16. The method of claim 13 further comprising: transferring an excess energy in each of said first inductive element and said second inductive element to said power source.

17. The method of claim 13 further comprising: transferring an excess energy in each of said first inductive element and said second inductive element to said load.

18. A method of supplying power using a power supply, a first inductive element, a second inductive element, a load, a first switching element, a second switching element, a third switching element and a fourth switching element, said method comprising:

opening said first switching element, closing said second switching element, opening said third switching element and closing said fourth switching element during a first time period to create a first circuit including said second switching element connected to said load connected to said fourth switching element connected to said power supply connected to said second switching element; and closing said first switching element, closing said second switching element, opening said third switching element and closing said fourth switching element during a second time period to create said first circuit, and a second circuit including said second switching element connected to said first switching element connected to said power supply connected to said second switching element.

19. The method of claim 18 further comprising:
closing said first switching element, opening said second switching element, closing said third switching element and opening said fourth switching element during a third time period to create a third circuit including said third switching element connected to said load connected to said first switching element connected to said power supply connected to said third switching element;
storing energy in said first inductive element during said second time period; and
transferring said energy from said first inductive element to said load during said third time period.

20. The method of claim 19 further comprising:
closing said first switching element, opening said second switching element, closing said third switching element and closing said fourth switching element during a fourth time period to create said third circuit, and a fourth circuit including said third switching element connected to said fourth switching element connected to said power supply connected to said third switching element;
storing energy in said second inductive element during said fourth time period; and
transferring said energy in said second inductive element to said load during said first time period.

21. The method of claim 18 further comprising: transferring an excess energy in each of said first inductive element and said second inductive element to said power source.

22. The method of claim 18 further comprising: transferring an excess energy in each of said first inductive element and said second inductive element to said load.

* * * * *